United States Patent [19]

Von Haas et al.

[11] Patent Number: 4,864,714
[45] Date of Patent: Sep. 12, 1989

[54] TOOL CHANGING DEVICE WITH TOOL DETECTION CLEANING

[75] Inventors: Rainer Von Haas, Geesthacht; Hans Tack, Velbert, both of Fed. Rep. of Germany

[73] Assignee: Fried. Krupp Gesellschaft mit beschränkter Haftung, Essen, Fed. Rep. of Germany

[21] Appl. No.: 212,102

[22] Filed: Jun. 27, 1988

[30] Foreign Application Priority Data

Jul. 4, 1987 [DE] Fed. Rep. of Germany ....... 3722197

[51] Int. Cl.[4] ........................................... B23Q 3/157
[52] U.S. Cl. ..................................... 29/568; 408/1 R; 408/8; 409/131; 409/137; 409/232
[58] Field of Search ................. 29/568, 26 A; 51/168; 409/232, 233, 234, 131, 134, 137; 279/20, 120; 408/6, 8, 16, 239 R, 239 A, 1

[56] References Cited

U.S. PATENT DOCUMENTS

| | | | |
|---|---|---|---|
| 3,593,614 | 7/1971 | Galbarini | 279/120 |
| 3,603,203 | 9/1971 | Rhodes | 409/232 |
| 4,480,366 | 11/1984 | Takahashi | 29/26 A |
| 4,504,824 | 3/1985 | Mello | 408/16 |
| 4,525,918 | 7/1985 | Puritz | 29/568 |
| 4,611,814 | 9/1986 | Hiestand | 279/20 X |
| 4,664,571 | 5/1987 | Takada et al. | 409/134 |
| 4,745,674 | 5/1988 | Abe et al. | 29/568 |

Primary Examiner—William Briggs
Attorney, Agent, or Firm—Spencer & Frank

[57] ABSTRACT

An apparatus for receiving a tool carrier comprises a tool holder defining a receiving bore adapted to receive a portion of the tool carrier, an arrangement for supplying pressurized fluid to the receiving bore of the tool holder to clean adjacent surfaces of the tool holder and the tool carrier during insertion of the tool carrier into the receiving bore; and an arrangement for detecting the pressure of the fluid supplied to the tool holder for ascertaining whether correct operational positioning of the tool carrier exists with respect to the tool holder.

7 Claims, 2 Drawing Sheets

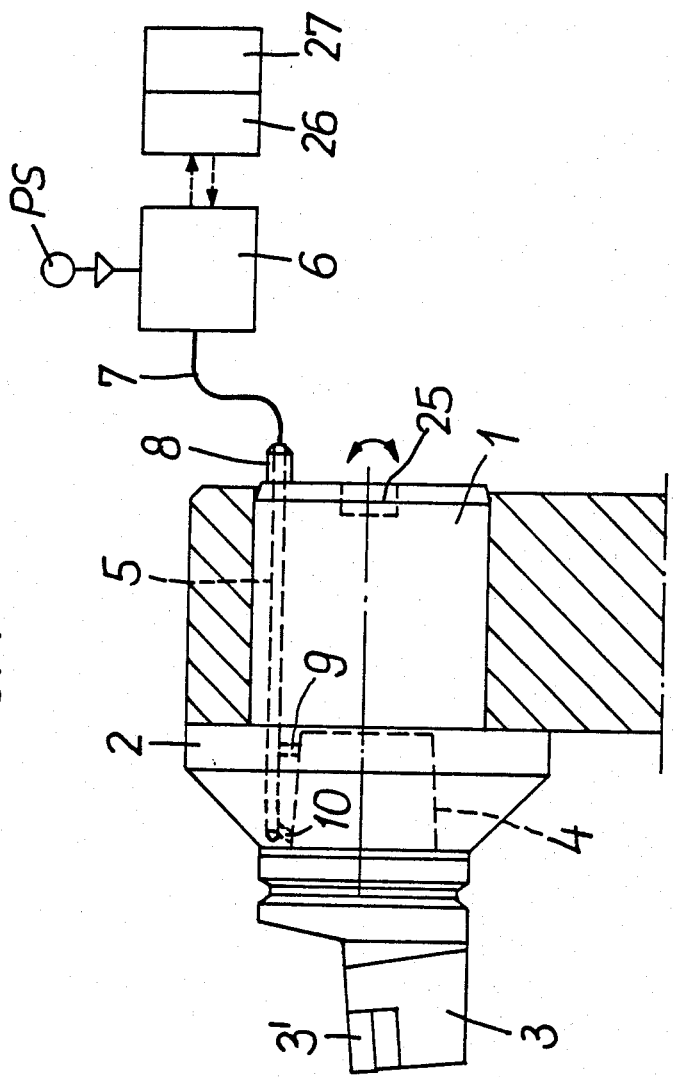

TOOL CHANGING DEVICE WITH TOOL DETECTION CLEANING

BACKGROUND OF THE INVENTION

The present invention relates to a method for monitoring the position of a tool carrier in a tool holder of a tool changing device and for cleaning the coupling faces between the tool holder and the tool carrier, and an apparatus for implementing the method.

In many machine tools the exchange of tools is performed with the aid of an automatic tool changing device. The tool is exchanged, for example, by means of a pivot arm which operates independently of the machine tool. During this process, the coupling faces between the tool carrier and the tool holder are often soiled by chips or other dirt which drops between them. The new tool then cannot be properly installed in the soiled tool holder. Reliable operation of the machine tool, free of malfunctions, is then no longer ensured, and the automatic machining operation is interrupted.

SUMMARY OF THE INVENTION

It is therefore an object of the present invention to provide a method for automatic cleaning of the coupling faces between a tool carrier and a basic tool holder and for simultaneously automatically verifying the operationally reliable positioning of the newly inserted tool.

This object and others to become apparent as the specification progresses, are accomplished by the invention, according to which, briefly stated, during positioning of the tool carrier, compressed air is fed to the basic tool holder through a system of bores, cutouts and annular gaps in such a manner that the mating faces and the planar faces between basic tool holder and tool carrier are cleaned. The continued influx of compressed air after the tool has been clamped in place produces a dynamic pressure increase which is registered by a pressure sensor connected to the air supply for the machine tool as a control signal for a machine control device for the release or blockage, respectively, of a subsequent process step.

The basic tool holder of a device according to the present invention generally includes a central, conically configured receiving bore to accommodate a chucking pin of a tool carrier. The tool carrier is connected with the basic tool holder by means of a clamping mechanism whose grippers are disposed in the center of the receiving bore, thereby forming a tool receptacle. Compressed air is introduced into the receiving bore through a system of bores and cutouts in the basic tool holder in such a manner that the air is distributed there in a ring-shaped pattern. The entire basic tool holder is precleaned by the air exiting at a high velocity therefrom. when the conical chucking pin of the tool carrier is introduced into the conical receiving bore, the internal face of the receiving bore and the external face of the chucking pin form a gap having an annular cross section which becomes progressively narrower as the chucking pin is progressively inserted within the receiving bore. The compressed air exits through this annular cross section with a relatively increasing velocity during insertion and thus cleans the mating faces of the tool receptacle in the region of the faces defining the gap. An undercut which is provided on the tool carrier along the edge formed by the external surface of the chucking pin and a planar face of the tool carrier, defines an annular recess with a chamfered distal end of the tool holder. The annular recess is in communication with the compressed air intake for the basic tool holder by way of a radial bore which is formed in the basic tool holder and which terminates at the chamfer. If the annular gap between the faces of the basic tool holder and the tool carrier is closed, as by the correct mated disposition of the chucking pin of the carrier within the receiving bore, the compressed air flows through the radial bore primarily into the annular gap formed between the undercut and the chamfer, thereby cleaning the planar faces between tool head and basic tool holder. Then a clamping screw of a clamping member can be tightened so that the annular gap between the respective planar faces of the tool carrier and the basic tool holder can be closed. Further incoming air creates a dynamic pressure increase which can be sensed, and the sensed signal can be supplied to the machine control. If the dynamic pressure has a sufficient magnitude, the machine will be enabled for further operation. If no precisely mating position is realized between the respective planar faces of the tool carrier and the basic tool holder, pressure losses occur which produce an error signal. The machine tool in this event is not enabled for the next process step.

BRIEF DESCRIPTION OF THE DRAWING

FIG. 1 is a schematic side elevational view of a carrier and a tool holder with block diagram, according to a preferred embodiment of the invention.

DESCRIPTION OF THE PREFERRED EMBODIMENT

Figure 3:
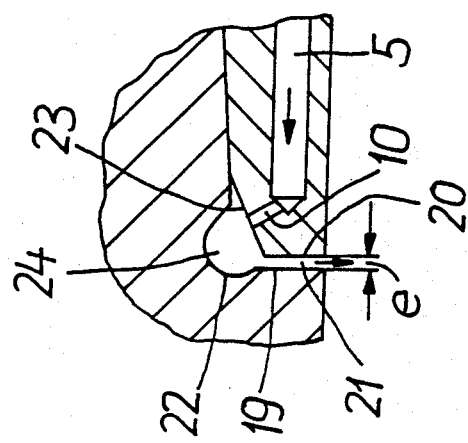
FIG. 3 is an enlarged detail view of a portion of FIG. 2.

The tool device shown in FIG. 1 essentially includes a tool shaft 1, a basic tool holder 2 and a tool carrier 3 supporting a cutting tool 3'. In a central, conical receiving bore 4 of the tool holder 2 a clamping member (not shown in FIG. 1) connects the tool carrier 3 with the basic tool holder 2. Compressed air can be introduced into the tool shaft 1 and into the receiving bore 4 through an air supply bore 5 provided in the shaft 1 and the tool holder 2. The compressed air is fed to the tool shaft from a pressure source PS through a control module 6, a hose conduit 7 and an adapter 8.

Figure 2:
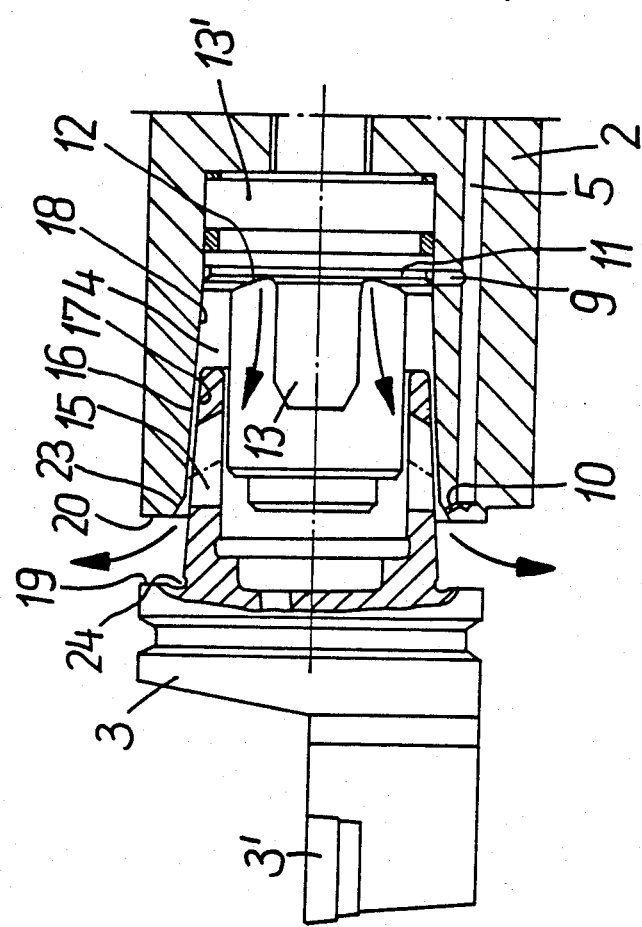
FIG. 2 is a sectional side elevational view of the tool holder and the tool carrier according to the preferred embodiment.

An automatic cleaning of the tool system according to the invention will now be described with particular reference to FIGS. 2 and 3.

After removal of the tool carrier 3 from the basic tool holder 2, compressed air is automatically introduced into the bore 5 of the tool shaft 1. The stream of air enters the receiving bore 4 through first and second passageways formed by bores 9 and 10, respectively. The compressed air exiting from the bore 9 is received by an annular groove 11 provided in a clamping member 13' and is distributed through four openings 12 to the annular interior of the receiving bore 4. This produces an initial cleaning effect particularly in the region of grippers 13 of the clamping member 13'.

During introduction of a conical chucking pin 15 of the tool carrier 3 into the likewise conical receiving bore 4 of the basic tool holder 2, the outer surface 17 of the chucking pin 15 and the inner wall 18 of the receiving bore 4 form an annular gap 16 which progressively narrows as the tool carrier 3 is inserted progressively further into the conical receiving bore 4. The compressed air exits from the annular nozzle-shaped passage or gap 16 with increasing velocity and thereby cleans the mating regions of the tool receptacle. The air continues to flow through the annular gap 16 until the faces 17 and 18 contact one another. The pressurized air then flows primarily through the bores 5 and 10 and enters into an annular space 24 which is formed between an undercut portion 22 at the root of the chucking pin 15 and a chamfer 23 of the tool holder 2, at the outer edge of the receiving bore 4. Due to a slight overdimensioning of the basic tool holder 2 as compared to the conical receiving bore 4, there initially remains a small gap 21, having a width e, between respective planar faces 19 and 20 of the tool carrier 3 and the tool holder 2. The air exits from the gap 21 in a radially outward direction and thereby cleans the respective planar faces 19 and 20 between the tool head of the tool carrier 3 and the basic tool holder 2.

While a single bore 5, communicating with a single bore 9 and a single radial bore 10, is shown, it is contemplated as being within the scope of the present invention to provide a plurality of bores 5 which each have at least one bore corresponding to bore 9 or radial bore 10. It is also contemplated as being within the scope of the present invention to provide a plurality of bores 9 or 10 communicating with the bore 5.

After the tool system has been cleaned, a verification is performed as follows to determine whether the inserted tool is in its operationally secure position: tightening of a clamping screw 25 (FIG. 1) presses the planar faces 19 and 20 together and thereby closes the gap 21. The further influx of air produces a dynamic pressure increase which is detected by a pressure limiting switch 28 integrated in the control module 6 and a signal is then supplied to a machine control device 27 via a personal computer 26. If the registered dynamic pressure is sufficiently high, the machine is then enabled for further operation. If, on the other hand, the tool head cannot be placed into an exactly planar position, for example due to soiling or deformation, air will continue to escape through the gap 21. The resultant loss of pressure is also detected by the pressure limiting switch 28 and this signal is supplied to the machine control 26 as an error signal. Due to this error signal, the machine is not enabled for the next process step.

It will be understood that the above description of the present invention is susceptible to various modifications, changes and adaptations, and the same are intended to be comprehended within the meaning and range of equivalents of the appended claims.

What is claimed is:

1. An apparatus for receiving a tool carrier, comprising:
    (a) a tool holder including an end face and inner wall surfaces defining a receiving bore which terminates at said end face adapted to receive a portion of the tool carrier,
    said bore having a separate end region adjacent said end face,
    said portion of said tool carrier having an outer surface;
    (b) a means for supplying pressurized fluid to an interior portion of said receiving bore of said tool holder to clean adjacent said surfaces of said tool holder and the tool carrier during insertion of the tool carrier into said receiving bore; said means for supplying pressurized fluid including a fluid passageway formed in said tool holder which is in communication with said receiving bore and a radial passageway communicating with said separate end region for cleaning said end face and an abutting portion of said tool carrier when inserted in said receiving bore; and
    (c) means for detecting the pressure of the fluid supplied to said tool holder for ascertaining whether correct operational positioning of the tool carrier exists with respect to said tool holder.

2. An apparatus as defined in claim 1, in combination with said tool carrier, wherein upon operationally correct engagement of said fool carrier with said tool holder, said surfaces are in a circumferential contact with one another and said end face of said tool holder has a chamfered circumferential terminal region
    which forms, together with an undercut part of said tool carrier, a relatively small gap and an annular recess through which the pressurized fluid is constrained to flow from said radial passageway, such that further clamping of said holder to said tool holder closes said gap, thereby causing a dynamic pressure increase to occur during continued supply of fluid to said radial passageway.

3. A method of monitoring the position of a tool carrier in a tool holder of a tool changing device and cleaning the coupling faces between the tool holder and the tool carrier , comprising the steps of:
    (a) providing a fluid supply source;
    (b) providing a tool holder having an end face, a receiving bore terminating at said end face, and a fluid supply path communicating with said fluid supply source, with said receiving bore, and with said end face, for supplying fluid to said receiving bore and to said end face;
    (c) providing a tool carrier having a chucking pin and an abutment face disposed at the root of said chucking pin, said abutment face having an undercut portion forming an annular groove;
    (d) progressively inserting said chucking pin of said tool carrier into said receiving bore;
    (e) supplying fluid to said fluid supply path during insertion of said chucking pin of said tool carrier into said receiving bore to cause fluid flow between said abutment face and said end face to clean said abutment and end faces , and introducing fluid into said receiving bore in an annular pattern to cause fluid flow between said receiving bore and said chucking pin to clean said receiving bore and said chucking pin; continuing to insert said chucking pin into said receiving bore until said chucking pin is completely received in said receiving bore; and
    (f) detecting fluid supply pressure to determine registration of said tool carrier in said tool holder.

4. A method as defined in claim 3, further comprising the step of:
    (e) providing a computing means for enabling subsequent operation based upon the magnitude of the detected fluid supply pressure.

5. A method as defined in claim 3, further comprising in step (b), providing said fluid supply path with a a first passage communicating with a proximal portion of said receiving bore to provide fluid flow for cleaning said chucking pin and said receiving bore during insertion of said chucking pin into said receiving bore and a second passage communicating with
- a distal portion of said receiving bore adjacent said end face to provide fluid flow for cleaning said abutment face of said tool carrier and said end face of said tool holder, and further comprising after step (e) and before
- step (f), clamping said tool holder to said tool carrier to eliminate a relatively small remaining gap between said abutment face and said end face, and, upon operationally correct registration of said tool carrier within said receiving bore, continuing to supply fluid to said second passage to cause a dynamic pressure increase, the dynamic pressure increase indicating operationally correct registration.

6. A method as defined in claim 3, further comprising the step of:
- (g) clamping said tool carrier and said tool holder together to close a relatively small remaining gap between said end face and said abutment face so that when said tool carrier and said tool holder are in operationally correct registration with each other and are clamped, fluid flow through said gap is stopped, and consequently a dynamic pressure increase occurs.

7. A self-cleaning changeable-tool automatic machining apparatus, comprising:
- (a) a tool carrier having a tool, a generally conical chucking pin, and an abutment face having an undercut portion at the root of said conical chucking pin; said conical chucking pin having an outer surface;
- (b) a tool holder including an end face and a generally conical inner wall surface defining a conical receiving bore adapted to receive said conical chucking pin of said tool carrier;
- (c) a means for supplying pressurized fluid to said receiving bore of said tool holder to clean adjacent said surfaces and adjacent said faces of said tool holder and said tool carrier during insertion of said tool carrier into said receiving bore; said means for supplying pressurized fluid including a fluid supply source and fluid passageways formed in said tool holder which are in communication with said fluid supply source and with said receiving bore; said receiving bore terminating at said end face of said tool holder, and said fluid passageways including a radial passageway communicating with an interior of said receiving bore at a region adjacent to said end face said radial passageway being directed toward said undercut portion when correct operational positioning of said tool carrier exists; and
- (d) means for detecting the pressure of the fluid supplied to said tool holder for ascertaining whether correct operational positioning of said tool carrier exists with respect to said tool holder.

* * * * *